[12] United States Patent
Mahowald

[10] Patent No.: US 8,076,628 B2
[45] Date of Patent: Dec. 13, 2011

[54] AMBIENT LIGHT SENSOR WITH REDUCED SENSITIVITY TO NOISE FROM INFRARED SOURCES

[75] Inventor: Peter H. Mahowald, Los Altos, CA (US)

[73] Assignee: Apple Inc., Cupertino, CA (US)

[*] Notice: Subject to any disclaimer, the term of this patent is extended or adjusted under 35 U.S.C. 154(b) by 166 days.

[21] Appl. No.: 12/238,380

[22] Filed: Sep. 25, 2008

[65] Prior Publication Data
US 2010/0072351 A1 Mar. 25, 2010

[51] Int. Cl.
G01J 1/44 (2006.01)
G06M 7/00 (2006.01)
[52] U.S. Cl. .................. 250/214 AL; 250/221
[58] Field of Classification Search .......... 250/214 AL, 250/214 R, 338.1, 339.01, 339.02, 339.05, 250/221, 205; 348/602, 152–155; 340/500, 340/541, 545.3, 538.12, 540, 573.1, 600; 455/39, 67.11, 91, 92, 95, 114.2, 130
See application file for complete search history.

[56] References Cited

U.S. PATENT DOCUMENTS

| | | | |
|---|---|---|---|
| 5,898,513 A | 4/1999 | Gist et al. | |
| 6,509,960 B2 | 1/2003 | Johnson et al. | |
| 7,714,265 B2 * | 5/2010 | Fadell et al. | 250/214 AL |
| 7,728,316 B2 * | 6/2010 | Fadell et al. | 250/559.38 |
| 2005/0225983 A1 | 10/2005 | Fornell | |
| 2008/0165116 A1 | 7/2008 | Herz et al. | |
| 2008/0200868 A1 | 8/2008 | Alberti et al. | |

OTHER PUBLICATIONS

Hyder, "Infrared Sensing and Data Transmission Fundamentals", Semiconductor Components Industries, LLC, 2002, Jul. 2002-Rev.1, AN1016/D.

* cited by examiner

Primary Examiner — Que T Le
Assistant Examiner — Pascal M Bui Pho
(74) Attorney, Agent, or Firm — Kramer Levin Naftalis & Frankel LLP

(57) ABSTRACT

Systems and methods are provided for detecting ambient light with reduced sensitivity to infrared sources. An electronic device may include an infrared sensor, an ambient light sensor, a decoder, and a processor. The infrared sensor may detect an intensity of infrared light. The ambient light sensor may be configured to detect incident light and to generate an electronic signal indicative of an intensity of visible light. The decoder may be configured to receive the intensity of infrared light and to generate an intensity of decoded infrared light. The processor, which may be coupled to the decoder and the ambient light sensor, may be configured to substitute an alternate electronic signal for the electronic signal if the intensity of infrared light exceeds a threshold amount.

10 Claims, 4 Drawing Sheets

300

AMBIENT LIGHT SENSOR WITH REDUCED SENSITIVITY TO NOISE FROM INFRARED SOURCES

FIELD OF THE INVENTION

This invention relates to systems and methods for detecting ambient light and, more particularly, to detecting ambient light with reduced sensitivity to noise from infrared sources.

BACKGROUND OF THE DISCLOSURE

Some electronic devices, such as laptop computers and cellular telephones, may be equipped with an ambient light sensor to support a variety of control functions, such as to adjust keyboard backlighting or display brightness. Some electronic devices may also be equipped with an infrared sensor for receiving infrared signals from, for example, a remote control. Infrared signals intended for the infrared sensor may interfere with operation of the ambient light sensor and cause the device to operate improperly. Thus, an ambient light sensor is needed that can suppress noise from infrared sources.

SUMMARY OF THE DISCLOSURE

Some embodiments of the invention relate to an electronic device that may include an infrared sensor, an ambient light sensor, a decoder, and a processor. The infrared sensor may detect an intensity of infrared light. The ambient light sensor may be configured to detect incident light and to generate an electronic signal indicative of an intensity of visible light. The decoder may be configured to receive the intensity of infrared light and to generate an intensity of decoded infrared light. The processor, which may be coupled to the decoder and the ambient light sensor, may be configured to substitute an alternate electronic signal for the electronic signal if the intensity of infrared light exceeds a threshold amount.

Some embodiments of the invention relate an ambient light sensor module that may include an infrared filter, an infrared sensor, and an ambient light sensor. The infrared filter may transmit incident light over a band of near-infrared wavelengths and may substantially reflect incident light over visible wavelengths. The infrared sensor may receive light transmitted by the infrared filter and for detecting an intensity of infrared light over near-infrared wavelengths. The ambient light sensor may be configured to detect an intensity of visible light and to generate an electronic signal indicative of an intensity of ambient light. The ambient light sensor may be configured to modify the electronic signal based on the intensity of the infrared light.

Some embodiments of the invention relate to a method for controlling an electronic device that may include detecting an intensity of all light at substantially any wavelength, detecting an intensity of infrared light over near-infrared wavelengths, generating an electronic signal indicative of an intensity of ambient light based on a difference between the intensity of all light and the intensity of infrared light, and generating a control signal dependent on the electronic signal or, if the intensity of infrared light exceeds a threshold intensity, generating the control signal based on an alternate electronic signal.

Some embodiments of the invention relate an ambient light sensor module that may include a first sensor for detecting an intensity of all light at substantially any wavelength, a second sensor for detecting an intensity of infrared light over near-infrared wavelengths, and a light processing module coupled to the first sensor and the second sensor. The light processing module may be configured to determine an intensity of visible light based on a difference between the intensity of all light and the intensity of infrared light and to substitute an alternative intensity of visible light for the intensity of visible light if the intensity of infrared light exceeds a threshold amount.

BRIEF DESCRIPTION OF THE DRAWINGS

The above and other aspects and features of the invention will become more apparent upon consideration of the following detailed description, taken in conjunction with the accompanying drawings, in which like reference characters refer to like parts throughout, and in which.

DETAILED DESCRIPTION OF THE DISCLOSURE

Embodiments of the invention relate to systems and methods for sensing ambient light with reduced sensitivity to noise from infrared ("IR") sources.

In the following discussion of illustrative embodiments, variations of the terms "coupled" or "in communication with" refer to, without limitation, any connection or coupling, either direct or indirect, between two or more elements whether physical, logical, electrical, or combinations thereof. As one skilled in the art will appreciate, inferred coupling (that is, where one element is coupled to another element by inference) includes direct and indirect coupling between two elements in the same manner as "coupled." The terms "a," "an," and the singular forms of words shall be taken to include the plural form of the same words, such that the terms mean that one or more of something is provided. The terms "comprising," "including," and "having," as used in the claims and specification herein, shall be considered as indicating an open group that may include other elements not specified. The terms "visible light," "photopic light," and "ambient light" are used interchangeably and generally refer to any light that can be detected by the human eye. Any reference to a particular wavelength includes wavelength bands that are "about" the stated wavelength and may be slightly longer or slightly shorter than the stated wavelength. The term "based on" is not exclusive and allows for being based on additional factors that may or may not be described.

It is to be understood that the figures and descriptions of the invention have been simplified to illustrate elements that are relevant for a clear understanding of the invention while eliminating, for purposes of clarity, other elements. For example, details relating to the translation, rather than generation, of control signals that cause an electronic device to respond in a certain way are not described herein. Similarly, certain details relating to sensor hardware, such as suitable infrared-sensitive semiconductor elements, are not described herein. A discussion of these elements is not provided because they are well known in the art and because they do not facilitate a better understanding of the invention.

Figure 1:
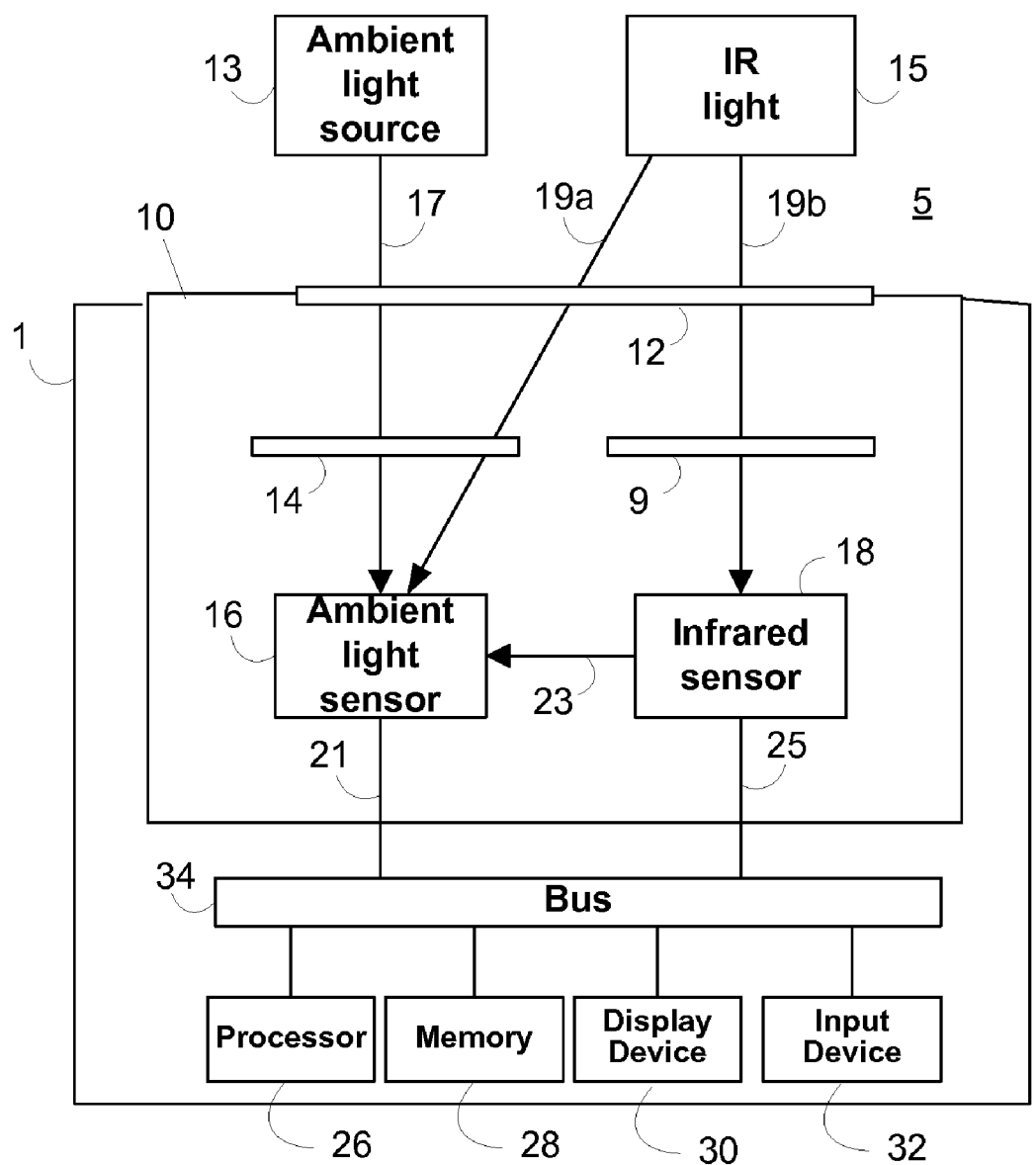
FIG. 1 is a functional block diagram of an electronic device with an ambient light sensor module according to some embodiments of the invention.

FIG. 1 is a functional block diagram of an exemplary environment 5 for operating an electronic device 1 equipped with an ambient light sensor (ALS) module 10 capable of suppressing noise from infrared sources according to some embodiments of the invention. Electronic device 1 includes ALS module 10, a processor 26, a memory 28, a display device 30, and an input device 32 coupled to a bus 34. ALS module 10 includes a window 12, an IR filter 9, a photopic filter 14, an ambient light sensor 16, and an IR sensor 18. By placing ambient light sensor 16 alongside IR sensor 18, ambient light sensor 16 may detect light not only from an ambient light source 13 but also IR light source 15, as indicated by arrows 17 and 19a, respectively. To reduce the sensitivity of ambient light sensor 16 to noise from IR light source 15, ambient light sensor 16 may be informed by infrared sensor 18, such as via an electronic signal 23 as shown.

Processor 26 may be a processor, an application-specific integrated circuit ("ASIC"), or any combination thereof. Processor 26 can, for example, control operation of electronic device 1, accept data signals from ambient light sensor 16 and/or IR sensor 18 and generate control signals for transmission to display device 30 and/or user input device 32. While electronic device 1 is illustrated with a single processor, those skilled in the art will appreciate that an electronic device may include multiple processors and/or co-processors.

Memory 28 can include read only memory ("ROM"), random access memory ("RAM"), solid-state memory, buffer memory, hard drive memory, any other memory known in the art or otherwise, or any combination thereof. In some embodiments, memory 28 can store sensor data generated by sensors 16 and 18, and/or any other sensor used for sensing light. In other embodiments, memory 28 also can store information related to previously or historically detected values indicative of an intensity of light for retrieval by electronic device 1.

Display device 30 may be configured to provide graphics (e.g., text, still images, and/or videos) to a user of device 1. Display device 30 may be any display, such as a backlit liquid crystal display, that can be configured to adjust, for example, backlight brightness and/or contrast based on electrical control signals. Those skilled in the art will appreciate that display parameters may be controlled by varying the amount of power to display device 30.

User input device 32 may be configured to allow a user to interact with electronic device 1. User input device 32 may be any input device, such as a keypad, keyboard, touchpad, or clickwheel, having one or more buttons configured to produce electrical luminescence, such as by using light emitting diodes. Display device 30 and user input device 32 can be integrated into one component, such as a touchscreen display.

IR sensor 18 may be any sensor, such as a silicon diode, configured to detect IR light and generate an analog or digital electronic signal, such as electronic signal 25, to be used in a control scheme, such as to cause electronic device 1 to respond to changing ambient light levels. IR sensor 18 may be integrated within the housing of an electronic device 1, such as behind and optically aligned with window 12.

Window 12 may be any medium or opening designed to substantially transmit visible light. Window 12 may be visible to a user of electronic device 1 so that the user can appropriately aim an IR remote control toward window 12.

IR filter 9 may be any optical filter designed to substantially transmit incident light in a range of wavelengths in the near-IR region and to substantially reflect incident light over visible wavelengths.

Photopic filter 14 may be any optical filter designed to substantially transmit incident light over visible wavelengths and substantially reflect incident light over a band of near-IR wavelengths. In some embodiments, photopic filter 14 may be configured to simulate the photopic response of the human eye to relatively bright or dim light.

Ambient light sensor 16 may be any light sensitive element configured to detect variations in ambient light, either continuously or periodically, and to provide an output (e.g., electronic signal 21) to be used in a control scheme, such as to cause electronic device 1 to respond. For example, ambient light sensor 16 may be a light sensitive transistor, such as a phototransistor, configured to generate an electronic signal 21 indicative of the intensity of the ambient light detected by ambient light sensor 16. Electronic signal 21 may be provided as an input into a logic circuit of electronic device 1. The logic circuit, not shown, may be used to cause electronic device 1 to change one or more settings of electronic device 1 based on the intensity or brightness of the ambient light detected. Although only one ambient light sensor 16 is shown, ambient light data may be collected from two or more ambient light sensors positioned at different locations on electronic device 1. Likewise, any number of IR sensors 18 may be used within the scope of the invention.

ALS module 10 may be configured to block a potentially erroneous value of electronic signal 21, such as when an IR remote control is used in close proximity to window 12, which may cause ambient light sensor 16 to overestimate the intensity of ambient light. In some embodiments, electronic device 1 may be configured to substitute an alternate value for electronic signal 21, such as while a threshold intensity of IR signal is being detected by IR sensor 18. The alternate value may be an intensity of visible light detected by ambient light sensor 16 before infrared sensor 18 detected the threshold intensity of infrared light. A sample-and-hold circuit may be configured to hold a level of the signal received by ambient light sensor 16 if IR sensor 18 receives a threshold IR signal. Likewise, the sample-and-hold circuit may be configured to disengage if IR sensor 18 receives an IR signal below the threshold intensity or if the circuit has stabilized. In some embodiments, a dual slope integration circuit may be used to offset or correct errors in the visible light output.

Figure 2:
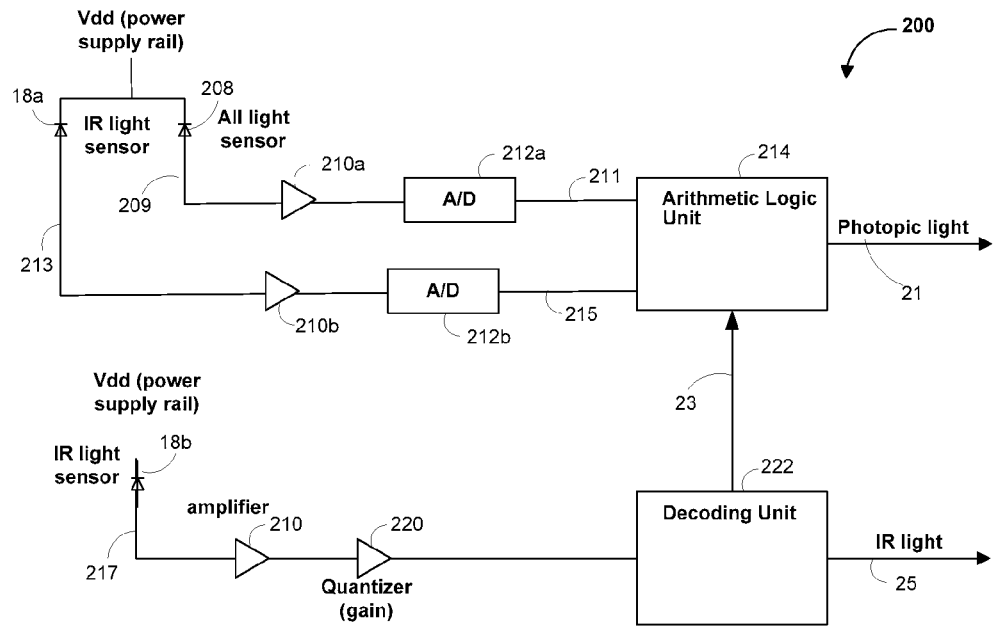
FIG. 2 is a schematic circuit diagram of an exemplary ambient light sensor ("ALS") module according to some embodiments of the invention.

FIG. 2 is a schematic circuit diagram of an exemplary ALS module 200 according to some embodiments of the invention. ALS module 200 includes IR sensors 18a and 18b, an all light sensor 208, amplifiers 210, 210a and 210b, analog-to-digital converters 212a and 212b, an arithmetic logic unit ("ALU") 214, and a decoding unit 222. All light sensor 208 may detect light at substantially any wavelength and may generate a signal 209. Signal 209 may be amplified by amplifier 210a and sent to analog-to-digital converter 212a, which may convert signal 209 into an electronic binary numerical value comprising an electronic signal 211.

IR sensor 18a may detect IR light at near-IR wavelengths and may generate a signal 213. Signal 213 may be amplified by amplifier 210b and sent to analog-to-digital converter 212b, which may convert signal 213 into an electronic binary numerical value comprising an electronic signal 215. ALU 214 may be configured to estimate an intensity of ambient light based on electronic signal 215 and electronic signal 211. For example, ALU 214 may be configured to calculate a difference between signal 215 and signal 211 and then generate photopic light signal 21. ALU 214 may also be configured to account for the presence of color filters, which may reflect visible light and cause all light sensor 208 to underestimate the intensity of ambient light.

IR sensor 18*b* may detect IR light at near-IR wavelengths and may generate a signal 217. Signal 217 may be amplified by amplifier 210 and may be quantized by a quantizer 220. Thereafter, signal 217 may be processed by a decoding device 222. Decoding device 222 may be configured to output IR light signal 25 that estimates an intensity of IR light.

In some embodiments, circuit 200 periodically or continuously detects ambient light and produces a new value of signal 21 indicative of the intensity of ambient light. If, however, IR sensor 18*b* detects a threshold intensity of IR light, such as when an IR remote control is operated in close proximity to ALS module 10, electronic signal 215 may be significantly larger than electronic signal 211. This difference in magnitude may cause ALU 214 to output a potentially erroneous value of electronic signal 21. Instead, ALU 214 may receive a blocking signal via electronic signal 23 from decoding unit 222 if the intensity of IR light exceeds a threshold amount. For example, if the intensity of IR light exceeds the threshold amount, electronic signal 23 may block ALU 214 from transmitting a potentially erroneous signal via electronic signal 21. In some embodiments, circuit 200 may be configured to substitute an alternate value, such as a prior value of signal 21, for the detected value.

Electronic signal 23 may include a carrier sense signal from received signal 217. In some embodiments, decoding unit 222 may be configured to remove or separate the carrier signal from signal 217 and output a clean digital control signal 23 to ALU 214. According to such an embodiment, clean digital control signal 23 may be determined by decoded 8-bit bytes or decoded bit frames.

Figure 3:
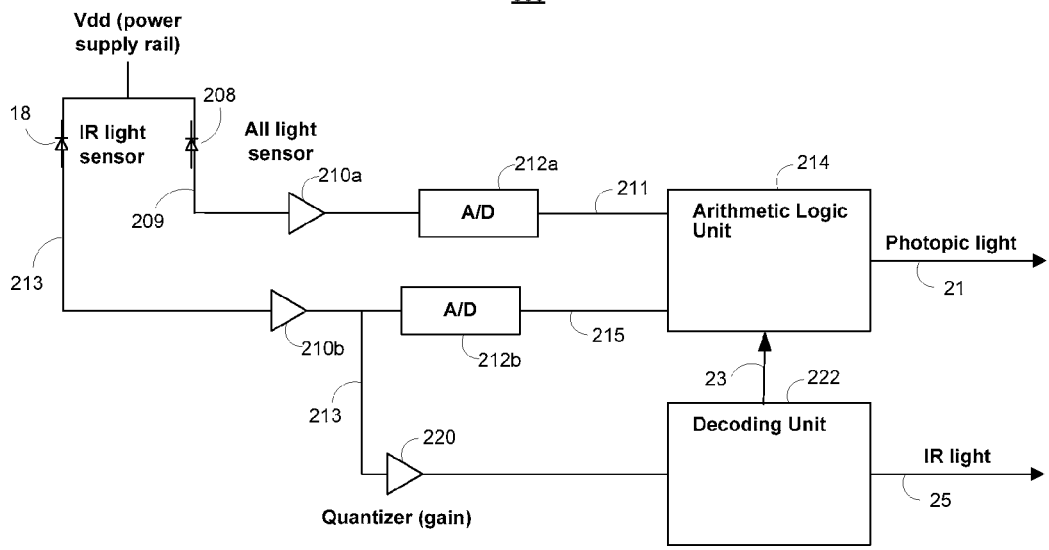
FIG. 3 is a schematic circuit diagram of an exemplary ALS module according to some embodiments of the invention.

FIG. 3 is a schematic circuit diagram of an exemplary ALS module 300 according to some embodiments of the invention. ALS module 300 is similar in many respects to ALS module 200 except that ALS module 300 uses one less diode. By combining ambient light circuit 202 and IR light circuit 204, ALU 214 and decoding device 222 both receive infrared data generated by a single IR sensor 18. Those skilled in the art will appreciate that, in embodiments like ALS module 300 that use one less diode may be used to achieve similar functionality at a reduced cost. Either ALS module 200 or ALS module 300 may be manufactured on a single chip.

Those skilled in the art will appreciate that amplifiers 210 and analog-to-digital converters 212 may be omitted from ambient light circuit 202 without departing from the invention. According to such an embodiment, ALU 214 may be configured to receive signals 209 and 213 directly.

Figure 4:
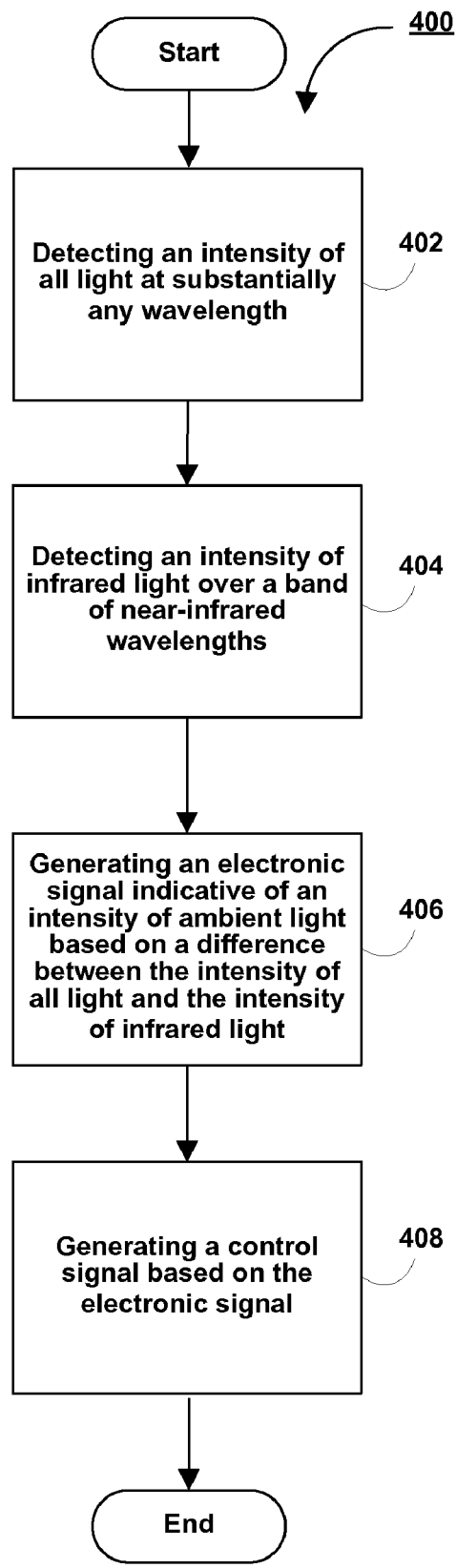
FIG. 4 is a process diagram of an exemplary method for detecting light according to some embodiments of the invention.

FIG. 4 is a process diagram of an exemplary method 400 for controlling an electronic device according to some embodiments of the invention. Method 400 begins in step 402 as the electronic device detects an intensity of incident light at substantially any wavelength (i.e., "all light"). At step 404, the electronic device may detect an intensity of infrared light over a band of near-infrared wavelengths. At step 406, the electronic device may generate an electronic signal indicative of an intensity of ambient light, which may be derived from a difference between the detected intensity of all light and the detected intensity of infrared light. At step 408, the electronic device may respond to the electronic signal generated at step 406, such as by adjusting keyboard backlighting or adjusting display brightness. For example, an increase in ambient light may result in a proportional increase in backlight intensity.

Figure 5:
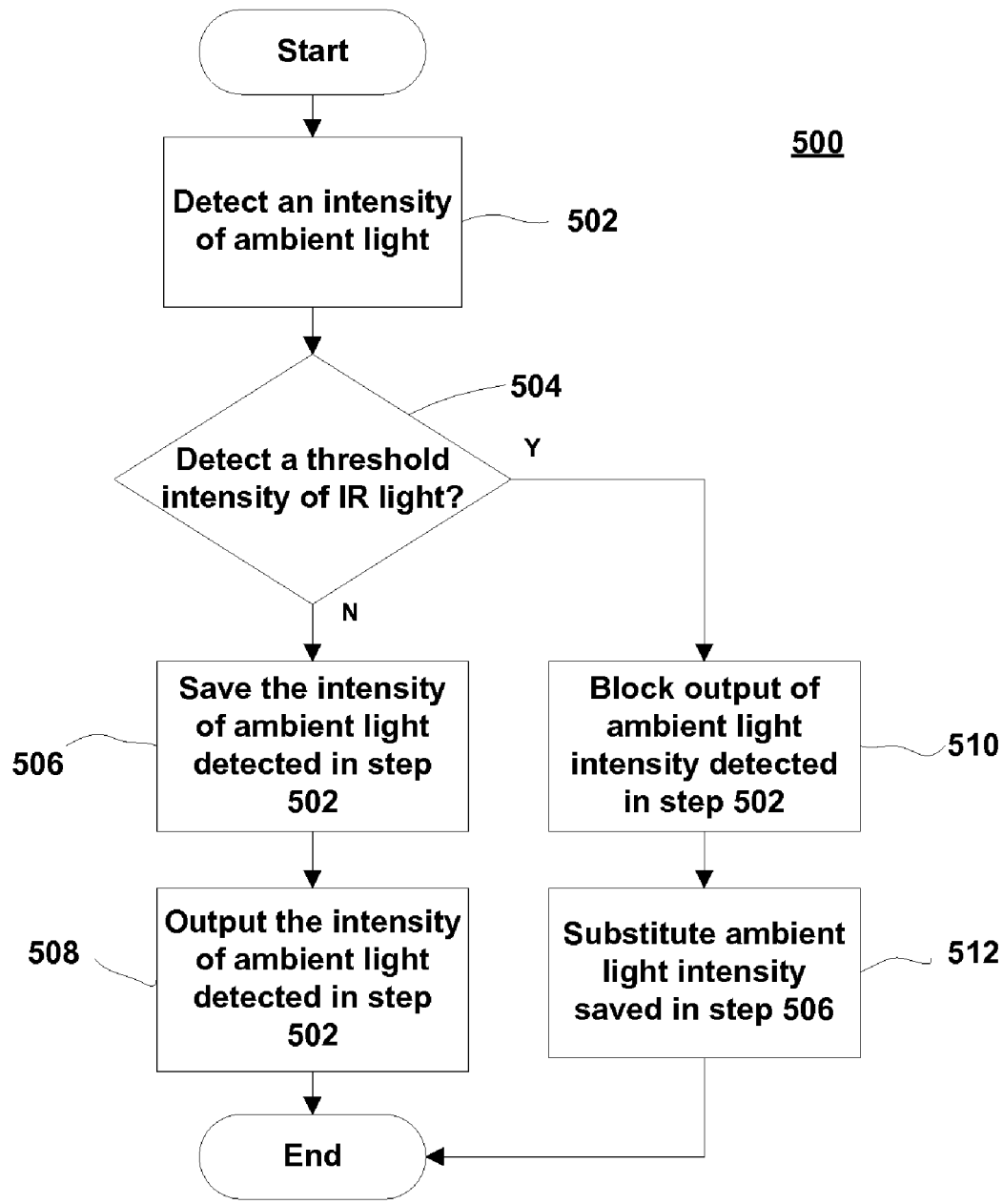
FIG. 5 is a process diagram of an exemplary method for detecting light according to some embodiments of the invention.

FIG. 5 is a process diagram of an exemplary method 500 for controlling an electronic device according to some embodiments of the invention. Method 500 begins in step 502 as the electronic device detects an intensity of ambient light. For example, ALU 214 may calculate an intensity of ambient light based on a difference between an intensity of all light (electronic signal 211) and an intensity of infrared light (electronic signal 215).

In step 504, the electronic device may determine whether a threshold intensity of infrared light has been detected. If the electronic device detects an intensity of infrared light below the threshold, the intensity of ambient light calculated in step 502 may be stored, in step 506, and output, in step 508. For example, ALU 214 may be informed by electronic signal 23 as to whether electronic signal 217 exceeds the threshold. If electronic signal 23 indicates that infrared sensor 18 detected an intensity of infrared light below the threshold amount, then the intensity of ambient light determined in step 502 may be stored, such as by using a store-and-hold circuit, and may be output in step 508. In some embodiments, the absence of electronic signal 23 may indicate that the intensity of infrared light is below the threshold amount.

If the electronic device detects an intensity of infrared light above the threshold, the intensity of ambient light calculated in step 502 may be blocked in step 510. For example, ALU 214 may block the intensity of ambient light determined in step 502 (based on electronic signals 211 and 215) from being output as electronic signal 21. At step 512, the electronic device may substitute the intensity of ambient light stored in step 506 for the intensity of ambient light determined in step 502. For example, ALU 214 may be configured to substitute a previous value of electronic signal 21 if electronic signal 23 indicates that sensor 18 detected an intensity of infrared light above the threshold amount. The substitution of step 512 may continue as long as a threshold intensity of infrared light is being detected.

While the systems and methods are described with respect to controlling keyboard backlighting and display brightness, it should be noted that the invention is applicable to any illuminating mechanism equipped with a light emitting diode or any other light producing means that can be controlled to emit light with variable intensities.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

One of ordinary skill in the art should appreciate that the invention may take the form of an entirely hardware embodiment or an embodiment containing both hardware and software elements. In particular embodiments, such as those embodiments that relate to methods, the invention may be implemented in software including, but not limited to, firmware, resident software, and microcode.

One of ordinary skill in the art should also appreciate that the methods and systems of the application may be practiced in embodiments other than those described herein. It will be understood that the foregoing is only illustrative of the invention disclosed herein, and that various modifications can be made by those skilled in the art without departing from the scope and spirit of the invention or inventions.

What is claimed is:

1. An electronic device comprising:
  an infrared sensor configured to detect an intensity of infrared light;

an ambient light sensor configured to detect incident light, wherein the ambient light sensor is configured to generate an electronic signal indicative of an intensity of visible light;
a decoder configured to receive the intensity of infrared light and to generate an intensity of decoded infrared light; and
a processor coupled to the decoder and the ambient light sensor, wherein the processor is configured to substitute an alternate electronic signal for the electronic signal if the intensity of the decoded infrared light exceeds a threshold amount.

2. The device of claim 1 further comprising:
an infrared filter interposed between the infrared sensor and an infrared source, wherein the infrared filter transmits infrared light over near-infrared wavelengths.

3. The device of claim 1 further comprising:
a photopic filter interposed between the ambient light sensor and an ambient light source, wherein the photopic filter transmits incident light over visible wavelengths, wherein the photopic filter receives incident light transmitted by the infrared window.

4. The device of claim 1, wherein the alternate electronic signal is a previous electronic signal.

5. The device of claim 4 further comprising:
a sample-and-hold circuit for providing the previous electronic signal.

6. The device of claim 1 further comprising:
an illumination mechanism configured to respond to the electronic signal or the alternate electronic signal.

7. An ambient light sensor module comprising:
an infrared filter for transmitting incident light over a band of near-infrared wavelengths;
an infrared sensor for receiving light transmitted by the infrared filter and for detecting an intensity of infrared light over near-infrared wavelengths; and
an ambient light sensor for detecting an intensity of visible light and for generating an electronic signal indicative of an intensity of ambient light, wherein the ambient light sensor is configured to modify the electronic signal based on the intensity of the infrared light.

8. An ambient light sensor module comprising:
a first sensor for detecting an intensity of all light at substantially any wavelength;
a second sensor for detecting an intensity of infrared light over near-infrared wavelengths; and
infrared light over near-infrared wavelengths; and
a light processing module coupled to the first sensor and the second sensor, wherein the light processing module is configured to determine an intensity of visible light based on a difference between the intensity of all light and the intensity of infrared light, and wherein the light processing module is configured to substitute an alternative intensity of visible light for the intensity of visible light if the intensity of infrared light exceeds a threshold amount.

9. The module of claim 8 further comprising:
a decoding module coupled to the second sensor and the light processing module, wherein the intensity of infrared light exceeds the threshold amount if the light processing module receives a blocking signal from the decoding module.

10. The module of claim 9, wherein the blocking signal is one of a carrier sense signal, decoded byte signal, and a decoded bit signal.

* * * * *